United States Patent [19]
Jeffer

[11] Patent Number: 5,644,814
[45] Date of Patent: Jul. 8, 1997

[54] ARTICULATED WINDSHIELD WIPER BLADE ASSEMBLY

[75] Inventor: Peter H. Jeffer, New York, N.Y.

[73] Assignee: New-View Windshield Wiper L.P., New York, N.Y.

[21] Appl. No.: 708,669

[22] Filed: Sep. 5, 1996

Related U.S. Application Data

[63] Continuation-in-part of Ser. No. 634,346, Apr. 18, 1996, Pat. No. 5,572,764.

[51] Int. Cl.$^6$ .................................. B60S 1/38; B60S 1/04
[52] U.S. Cl. ......................... 15/250.361; 15/250.33; 15/250.451; 15/250.48
[58] Field of Search .................. 15/250.33, 250.48, 15/250.04, 250.452, 250.451, 245, 250.4, 250.41, 250.44

[56] References Cited

U.S. PATENT DOCUMENTS

| | | | |
|---|---|---|---|
| 2,834,976 | 5/1958 | Oishei | 15/245 |
| 3,040,359 | 6/1962 | Deibel | 15/250.36 |
| 3,099,031 | 7/1963 | Ludwig | 15/250.42 |
| 3,405,421 | 10/1968 | Tomlin | 15/250.42 |
| 3,414,930 | 12/1968 | Kodama | 15/250.36 |
| 3,961,395 | 6/1976 | Journer | 15/250.48 |
| 4,698,874 | 10/1987 | Fritz | 15/250.33 |
| 5,243,731 | 9/1993 | Yang | 15/250.19 |
| 5,257,436 | 11/1993 | Yang | 15/250.4 |
| 5,392,488 | 2/1995 | Li | 15/250.41 |
| 5,442,833 | 8/1995 | Jean-Louis | 15/250.31 |
| 5,465,454 | 11/1995 | Chang | 15/250.41 |

FOREIGN PATENT DOCUMENTS

| | | | |
|---|---|---|---|
| 0232698 | 8/1987 | European Pat. Off. | |
| 1047648 | 12/1953 | France | 15/250.33 |
| 56-138048 | 10/1981 | Japan | |
| 2189383 | 10/1987 | United Kingdom | 15/250.33 |

Primary Examiner—Gary K. Graham
Attorney, Agent, or Firm—Salter & Michaelson

[57] ABSTRACT

An articulated twin spline windshield wiper blade assembly for acceptance in the claws of a conventional windshield wiper arm assembly comprises a female spline having a circular channel therein for journaling of a cylindrical portion of a male spline. A portion of the male spline is truncated to define a channel for egress of water and debris and to minimize friction between the male and female splines.

1 Claim, 1 Drawing Sheet

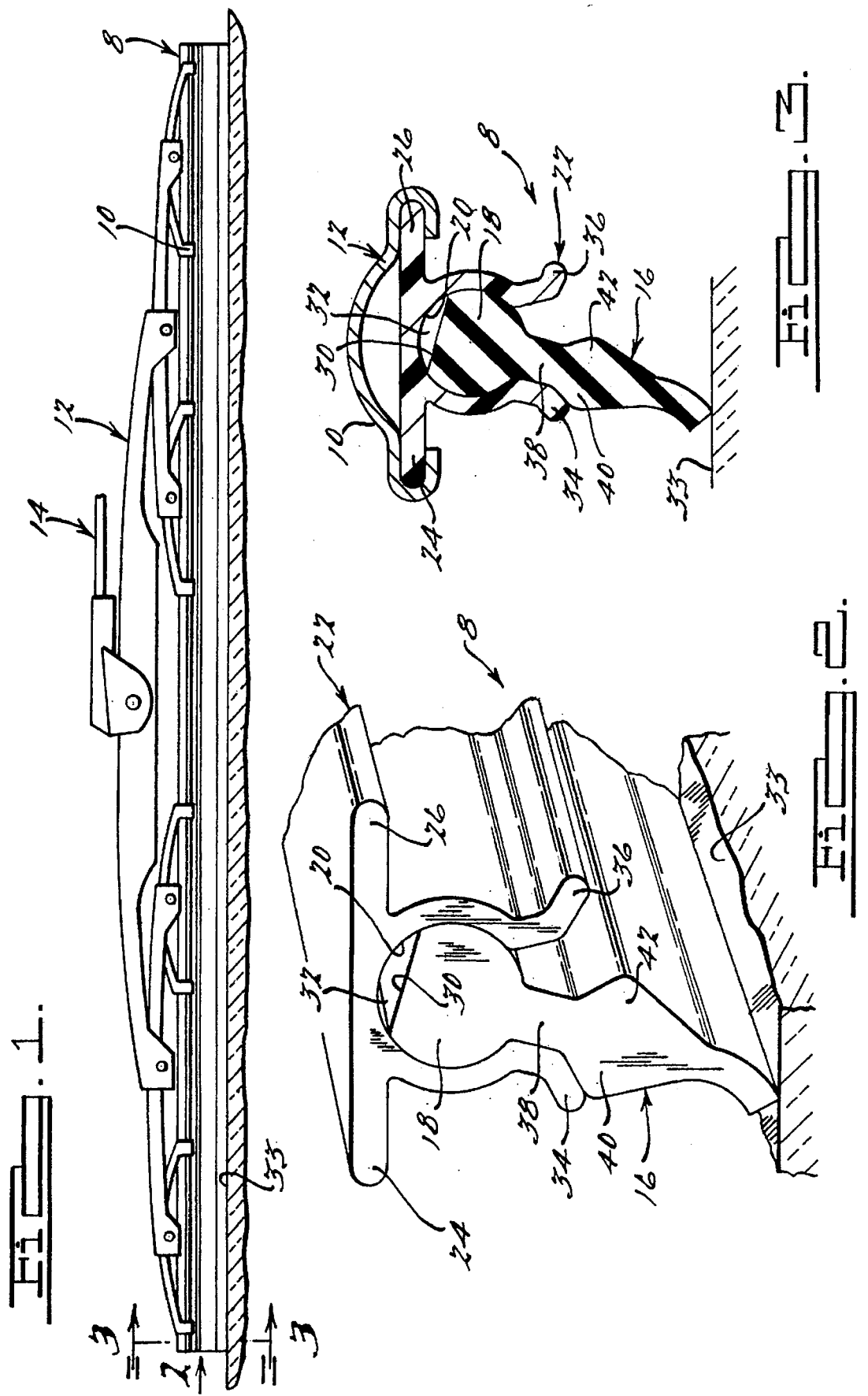

ARTICULATED WINDSHIELD WIPER BLADE ASSEMBLY

This application is a continuation-in-part of application Ser. No. 634,346 filed Apr. 18, 1996 now U.S. Pat. No. 5,572,764.

BACKGROUND OF THE INVENTION

Windshield wiper blade assemblies that utilize rotation of a wiping blade relative to a carrier are known. While such known blade assemblies exhibit improved performance on curved surfaces, they fail to solve a problem associated with positive articulation or "flip" of the wiper blade as well as the speed of "flip". Specifically, the wiper blades of such known blade assemblies exhibit relatively high resistance to rotation thereby inhibiting "flip" of the wiper blade.

SUMMARY OF THE INVENTION

The invention relates to an articulated windshield wiper blade assembly wherein the wiper blade exhibits a relatively low resistance to rotation about an axis extending parallel to the windshield so as to insure and maximize the speed of "flip".

More specifically, a conventional wiper arm and claw system supports a full-length wiper blade assembly. The blade assembly comprises interlocked male and female splines. The male spline is journaled in the female spline for rotation about an axis that extends parallel to the wiping edge thereof and to the surface being wiped. Support flanges on the female spline are accepted in the claws of a conventional wiper blade holder. The female spline of the blade assembly is made of relatively high durometer polymeric material, for example, 70 to 80 on the Shore "D" scale, to insure structural integrity. The male spline is made of relatively lower durometer elastomeric material, for example, 55 to 65 on the Shore "A" scale, to maximize wiping efficiency.

In accordance with the present invention, a portion of the male spline that is journaled in the female spline is relieved so as to minimize friction therebetween upon rotation of the male spline relative to the female spline thereby to maximize "flip" speed of the wiper blade. Moreover, relief of the male spline creates a waste duct between the splines to provide for automatic drainage of water and debris thereby to insure "flip".

BRIEF DESCRIPTION OF THE DRAWING

FIG. 1 is an elevational view of a windshield wiper assembly utilizing the articulated wiper blade assembly of the present invention;

FIG. 2 is a view taken in the direction of the arrow "2" of FIG. 1;

FIG. 3 is a cross-sectional view taken along the line 3—3 of FIG. 1.

DETAILED DESCRIPTION OF THE PREFERRED EMBODIMENT

An articulated twin spline wiper blade assembly 8, in accordance with a preferred constructed embodiment of the instant invention, is supported in claws 10 of a conventional blade holder 12. The blade holder 12 is pivotally connected to a wiper arm 14 in the conventional manner.

The twin spline wiper blade assembly 8 comprises a male spline 16 having a right circular cylindrical upper portion 18 and a lower portion 10, defining a pair of wiping edges 19a and 19b. The upper portion 18 of the male spline 16 is journaled in a right circular cylindrical channel 20 of a female spline 22.

The female spline 22 has a pair of tangentially extending flanges 24 and 26 on opposite sides, respectively, of the cylindrical channel 20 therein that are accepted in the reentrantly folded claws 10 of the blade holder 12.

In accordance with the present invention, the cylindrical portion 18 of the male spline 16 is truncated by a flat surface 30 that, in combination with the channel 20 in the female spine 22, defines a water and debris discharge channel 32 and reduces the area of engagement, and therefore friction, between the male spline 16 and female spline 22. The reduction in friction minimizes the resistance to rotation or "flip" of the male spline 16 about an axis extending parallel to a surface 33 to be wiped. The cylindrical channel 20 of the female spline 22 is discontinuous so as to define a pair of stops 34 and 36 which are circumferentially spaced from one another at, for example, 30 degrees. Rotation of the male spline 16 relative to the female spline 22 is limited by engagement of a neck 38 and shoulders 40 or 42 on the male spline 16 with one or the other of the stops 34 or 36 on the female spline 22, respectively.

It is to be noted that the stops 34 and 36 are flared radially outwardly to protect the channel 20 of the female spline 22 against ice and debris accumulation as well as to utilize windage to apply a downward force against the surface 33 being wiped.

While the preferred embodiment of the invention has been disclosed, it should be appreciated that the invention is susceptible of modification without departing from the scope of the following claims:

I claim:

1. In an articulated twin spline windshield wiper blade assembly for acceptance in claws of a conventional windshield wiper arm assembly, said assembly comprising an elongated relatively high durometer polymeric female spline having a cylindrical channel therein, the improvement comprising:

an elongated relatively low durometer elastomeric male spline having a cylindrical portion complimentary to the channel in said female spline so as to be journaled for rotation therein and a wiping portion with a pair of spaced wiping edges engageable, alternately, with a surface to be wiped upon rotation of said male spline relative to said female spline, the cylindrical portion of said male spline being truncated so as to define a channel between said male and female splines for the egress of water and debris and to minimize friction between said male and female splines.

* * * * *